United States Patent [19]

Baas

[11] Patent Number: 5,448,549
[45] Date of Patent: Sep. 5, 1995

[54] PROCESS FOR STOPPING A ROTATING DISC-SHAPED RECORD MEDIUM

[75] Inventor: Dieter Baas, Kehl-Auenheim, Germany

[73] Assignee: Deutsche Thomson-Brandt GmbH, Villingen-Schwenningen, Germany

[21] Appl. No.: 949,257

[22] PCT Filed: May 14, 1991

[86] PCT No.: PCT/EP91/00891

§ 371 Date: Dec. 3, 1992

§ 102(e) Date: Dec. 3, 1992

[87] PCT Pub. No.: WO91/18391

PCT Pub. Date: Nov. 28, 1991

[30] Foreign Application Priority Data

May 23, 1990 [DE] Germany ............ 40 16 551.5

[51] Int. Cl.$^6$ .............. G11B 23/00; G11B 19/22; H02P 3/10
[52] U.S. Cl. ................... 369/266; 369/231; 318/257
[58] Field of Search ............... 369/266, 239, 240, 241, 369/189, 267, 232, 233, 234, 235, 236, 237, 268, 275.2, 53, 54; 360/73.01, 74.1; 318/257, 369, 375, 484, 466, 453, 454

[56] References Cited

U.S. PATENT DOCUMENTS

| | | | |
|---|---|---|---|
| 4,338,683 | 7/1982 | Furukawa et al. | 369/189 |
| 4,388,713 | 6/1983 | Tatsuguchi | 369/189 |
| 4,423,498 | 12/1983 | Kimura et al. | 369/189 |
| 4,439,849 | 3/1984 | Nabeshima | 369/240 |
| 4,629,949 | 12/1986 | Senso . | |
| 4,653,040 | 3/1987 | Senso | 369/239 |
| 4,710,825 | 12/1987 | Okita et al. | 369/239 |
| 4,779,260 | 10/1988 | Kaneko et al. . | |
| 5,050,145 | 9/1991 | Yoshida | 369/189 |

FOREIGN PATENT DOCUMENTS

| | | |
|---|---|---|
| 0322177 | 6/1989 | European Pat. Off. . |
| 0327109 | 8/1989 | European Pat. Off. . |
| 0352728 | 1/1990 | European Pat. Off. . |
| 2470506 | 5/1981 | France . |

Primary Examiner—Robert S. Tupper
Assistant Examiner—Allen Cao
Attorney, Agent, or Firm—Spencer, Frank & Schneider

[57] ABSTRACT

Process for stopping a record-shaped, rotating information medium, for example, a CD. CD-players, for example, are provided with a loading and unloading mechanism for the information medium, the CD. However, before a CD can be automatically unloaded by the CD-player after reproduction or activation of a STOP-key, the rotation of the CD must be stopped in order to avoid damages of its sensitive surface. Because the moment of inertia and the diameter of records (CDs) are varied, and because a small mini-CD exists, it may occur that the CD is still rotating during the unloading process. To stop the record (CD) safely independently of its moment of inertia and its size, a first applied braking pulse (B1) causes the record (CD) to be braked to full stop and subsequently to be accelerated in the opposite direction. In the course of this braking and acceleration, the time T, which passes until the rotational speed of the record (CD) has reversed due to the first braking pulse (B1) from a preset value +N to a value −N, is measured. Moreover, when the rotational speed has reached the value −N, the polarity of the first braking pulse (B1) is reversed and a second braking pulse (B2) is applied and terminated after time T/2. As a result, the record (CD) will be safely and quickly braked from the rotational speed −N to a full stop. The process can be used, for example, for CD-players, video record players, DRAW-disc-players or magneto-optical sets.

9 Claims, 1 Drawing Sheet

PROCESS FOR STOPPING A ROTATING DISC-SHAPED RECORD MEDIUM

BACKGROUND OF THE INVENTION

The invention relates to a process for stopping of a rotating, record-shaped information medium.

CD-player or video record player are for instance equipped with a loading—and unloading device into which the information medium, a compact disc or a video record, is manually inserted or out of which the same can be taken by hand. After inserting the record, the record is automatically brought into the reproduction position. By means of a so-called STOP-key the user of the CD-player can at any time interrupt the reproduction of a record. The record will be stopped and moved automatically into the unloading position so that the user can remove the record from the loading device for instance in order to be able to insert a different record.

Before, however, the record is brought from the reproducing position into the unloading position, the same should be braked possibly to full-stop by the motor of the record drive in order to avoid damage of its sensitive surface during the unloading process.

The rotational speed of a record is not constant, because in a CD-player the system concerned is, contrary to a CAV (constant-angular-velocity) system which keeps the angular velocity constant, a CLV (constant-linear-velocity) system which keeps the linear velocity constant.

It can therefore absolutely be the case that the record still rotates during the unloading process, either in the reproducing direction or even in the reverse direction, depending on the braking action by the motor, i.e., not enough or too much. Also because the mass and the diameter are different from record to record and because the small mini-CD exists besides, it may occur that the record is still rotating during the unloading process. As mentioned already the sensitive surface of a record, which still rotates during the automatic unloading process, can easily be damaged.

In order to make certain that the record really is stopped at the beginning of the unloading process, there should be provided a short waiting time between the braking of the record and the unloading process as a time clearance during which the record can run down. This measure has, however, the draw-back that the unloading process will be delayed.

It is therefore the object of the invention to provide a process for the stopping of a rotating, record-shaped information medium such that the rotating information medium will be fast and reliably braked down to total stop for unloading.

SUMMARY OF THE INVENTION

The invention solves the above object by the following process steps a) the information medium is braked by a first braking pulse, b) when the rotational speed of the information medium is reduced to a presettable value $+N$, the time T is measured until the rotational speed of the information medium reaches the opposite value $-N$, c) when the rotational speed of the information medium is reversed to the value $-N$, the polarity of the first braking pulse is reversed and d) after the time $T/2$, the second or reversed braking pulse is discontinued.

A second development of the invention provides for repeating the process steps a) to c) several times and to form the mean value $T_M$, using the measured times T, which pass each time at reversal of the rotational speed, and to dimension the duration of the last braking pulse to $T_M/2$.

By this measure the duration of the last braking pulse, which brakes the information medium to a complete stop, will be determined more exactly than with the first development according to the invention.

DETAILED DESCRIPTION OF THE PREFERRED EMBODIMENT

Figure 1:
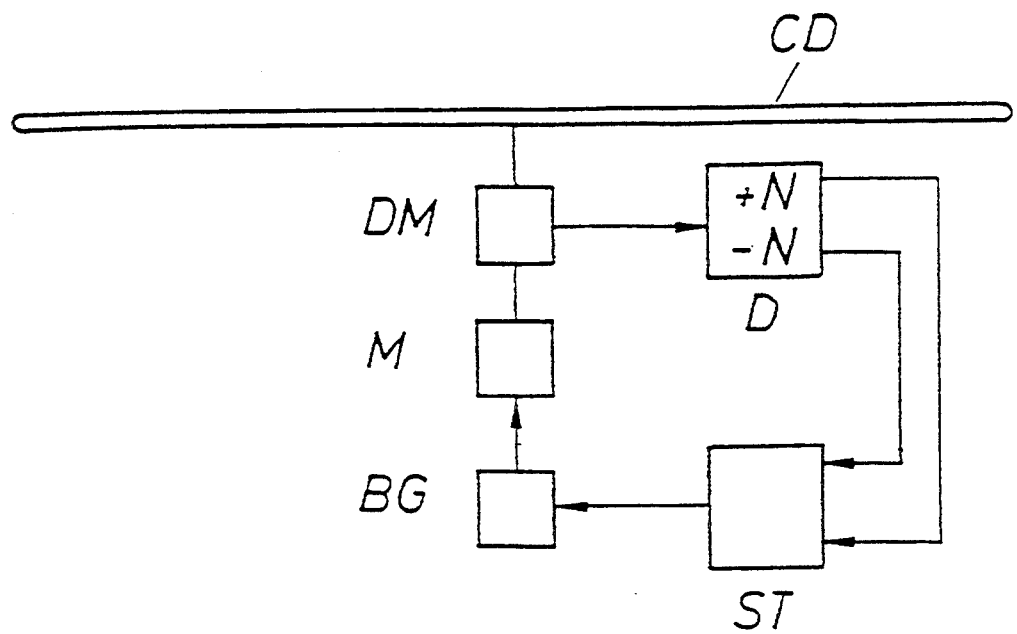
FIG. 1 is a block circuit diagram of an arrangement for realizing the process according to the invention

FIG. 1 shows the drive motor M, which drives a compact-disc CD. A revolution counter DM, which measures the rotational speed of the record CD, is connected with the input of a detector D, whose both outputs are connected with both inputs of a control circuit ST. The output of the control circuit ST is connected with the input of a braking pulse generator BG, whose output is connected with the drive motor M.

Figure 2:
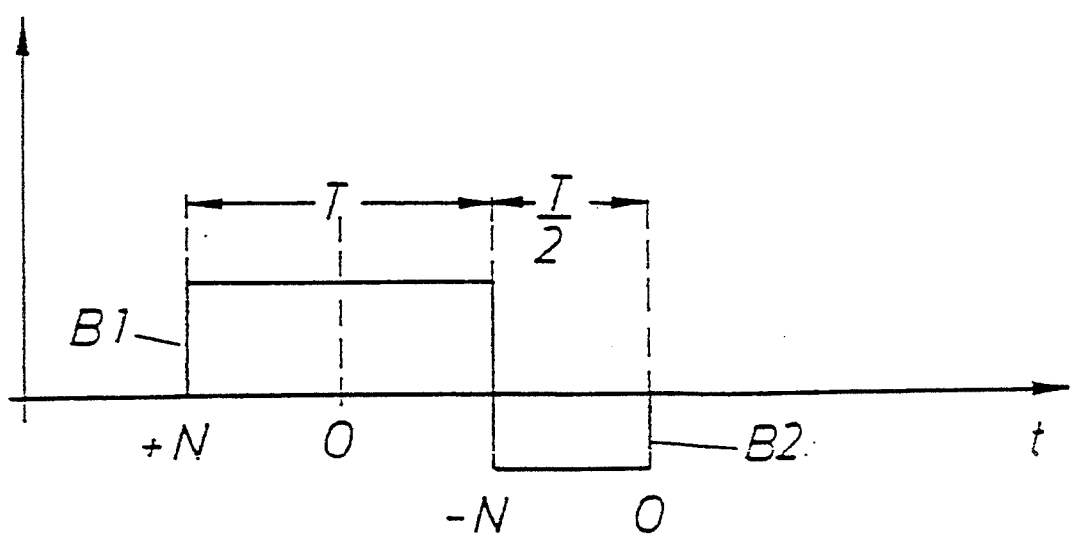
FIG. 2 is a pulse diagram for explaining the invention

For stopping the record CD the braking pulse generator BG supplies a first braking pulse B1 (FIG. 2) to the drive motor M, whereby the record CD is braked down. As soon as its rotational speed is reduced to a presettable value $+N$, the detector D supplies a first signal to the control circuit ST, which now measures the time T which passes until the detector D supplies a second signal to the control circuit ST. Because the first braking pulse B1 of the braking pulse generator BG remains at the drive motor M, the record CD is braked further than the rotational speed $+N$ to full-stop or zero rotation speed and following then accelerated the opposite direction. When the rotational speed of the record CD has been reversed to the rotational value $-N$, the detector D supplies a second signal to the control circuit ST. The control circuit ST, which has measured the time T between the first and the second signals of the detector D, causes the polarity of the first braking pulse B1 to be reversed and the such formed second braking pulse B2 of reversed polarity to be terminated after the time $T/2$. By this measure the record CD is safely and quickly braked down to full-stop.

By the application of the first braking pulse B1, the rotational speed of the record CD initially is reduced to zero or full-stop; because, however, the first braking pulse B1 is still being applied to the motor M, the motor and consequently the record CD will be accelerated in the opposite direction.

The invention now starts out from the perception, that the time $T/2$, which passes until the speed of the record CD has been reduced from a presettable rotational speed $+N$ to zero, is equally as great as the time which passes until the record CD starting at full-stop has been however accelerated into the opposite direction, and is equally as great as the time which passes until the record is braked down to full-stop beginning at the rotational speed $+N$ or $-N$. When the record rotates with the rotational speed −N in the opposite direction, a braking pulse of opposed polarity brakes the record therefore in the time T/2 exactly to full-stop.

An essential advantage of the process according to the invention exists in that the diameter and the moment of inertia of the record play no part anymore. Each record will be braked down to full-stop every time independent of its diameter and its moment of inertia.

The invention is adapted for recording- and/or reproducing-sets having a rotating record-shaped information medium as for instance CD-players, video record players, DRAW-disc-players or magneto-optical sets.

I claim:

1. Process for stopping a rotating record-shaped information medium (CD) characterized by the following process steps:
    a) braking the information medium (CD) by the application of a first braking pulse (B1);
    b) when the rotational speed of the information medium (CD) is reduced to a presettable value +N, measuring the time T which passes until the rotational speed of the information medium (CD) reaches the reversed value −N;
    c) when the rotational speed of the information medium (CD) has reversed to the value −N, reversing the polarity of the first braking pulse (B1) to form a second braking pulse (B2) and
    d) after the time T/2, terminating the second braking pulse (B2).

2. Process for stopping a rotating record-shaped information medium (CD) characterized by the following process steps:
    a) braking the information medium (CD) by application of a first braking pulse (B1);
    b) when the rotational speed of the information medium (CD) is reduced to a presettable value +N, measuring the time T which passes until the rotational speed of the information medium (CD) reaches the reversed value −N;
    c) when the rotational speed of the information medium (CD) has reversed to the value −N, reversing the polarity of the first braking pulse (B1);
    d) repeating the process steps a) to c) several times;
    e) determining the mean value $T_M$ from the measured times; and
    f) dimensioning the duration of the last braking pulse to be $T_M/2$.

3. Process according to claim 1, wherein a detector (D) supplies a first signal to a control circuit (ST) when the rotational speed of the information medium (CD) is reduced to the presettable value +N due to the first braking pulse (B1), and that the detector (D) supplies a second signal to the control circuit (ST), when the rotational speed of the information medium (CD) reaches the opposed value −N due to the first braking pulse (B1).

4. Process according to claim 2, wherein control circuit (ST) measures the time T, which passes until the rotational speed of the information medium (CD) reverses from value +N to the value −N.

5. Process according to claim 4, wherein the control circuit (ST) controls a braking pulse generator (BG).

6. Process according to claim 5, wherein the control circuit (ST), at the time when the rotational speed of the information medium (CD) reaches the value −N, causes the reversal of polarity in the braking pulse generator (BG) of the first braking pulse (B1) and terminates the second braking pulse (B2) formed in this way after the time T/2.

7. Arrangement for realizing the process according to claim 1 having a drive motor (M) for turning an information medium (CD), a revolution (r.p.m.) counter (DM) which measures the rotational speed of the information medium (CD) and whose output is connected to a detector (D) which has an output connected to a control circuit (ST) which itself has an output connected to a braking pulse generator (BG) whose output is in turn connected to the drive motor (M) for the information medium (CD), and wherein: the detector (D) supplies a first signal to the control circuit (ST) when the rotational speed of the information medium (CD) has dropped to a predeterminable value +N as a result of the first braking pulse (B1), the detector (D) supplies a second signal to the control circuit (ST) when the rotational speed of the information medium (CD) has reached the opposing rotational speed value −N as a result of the first braking pulse (B1), the control circuit (ST) measures the time T which elapses until the rotational speed of the information medium has reversed from value +N to value −N, and that at the time when the rotational speed of the information medium (CD) has reached the value −N, the control circuit (ST) triggers a reversal of polarity of the first braking pulse (B1) in the braking pulse generator (BG) to form a second braking pulse (B2) and terminates the second braking pulse (B2) after the time T/2.

8. A process for stopping a rotating disc-shaped record medium driven by a drive motor comprising the steps of:
    (a) applying a first braking voltage to the drive motor;
    (b) measuring the rotational speed of the record medium during the application of the first braking voltage;
    (c) when the rotational speed of the record medium has dropped to a predeterminable value +N as a result of the first braking voltage, measuring the time T which elapses until the rotational speed of the record medium has reversed from value +N to value −N;
    (d) at the time when the rotational speed of the record medium has reached the value −N, reversing the polarity of the first braking voltage to apply a second braking voltage; and
    (e) terminating the second braking voltage after the time T/2.

9. A process for stopping a rotating disc-shaped record medium driven by a drive motor as defined in claim 8, further comprising: after said step (e), repeating said steps (a) to (e) several times; determining the mean value $T_M$ of the measured times T; and dimensioning the duration of the time the last second braking voltage is applied to be $T_M/2$.

* * * * *